US006702473B2

(12) United States Patent
Kahlman et al.

(10) Patent No.: US 6,702,473 B2
(45) Date of Patent: Mar. 9, 2004

(54) ROLLING BEARING

(75) Inventors: Lars Kahlman, Partille (SE); Robin Cundill, Buxton (NL); Charlotte Vieillard, Nieuwegein (NL); Maarten Noordman, Hilversum (NL)

(73) Assignee: Aktiebolaget SKF, Gothenburg (SE)

( * ) Notice: Subject to any disclaimer, the term of this patent is extended or adjusted under 35 U.S.C. 154(b) by 28 days.

(21) Appl. No.: 10/020,432

(22) Filed: Dec. 18, 2001

(65) Prior Publication Data

US 2002/0168125 A1 Nov. 14, 2002

(30) Foreign Application Priority Data

Dec. 18, 2000 (SE) ............................................. 0004813-2

(51) Int. Cl.$^7$ .............................................. F16C 33/30
(52) U.S. Cl. ...................... 384/492; 384/907; 384/911; 384/908; 384/907.1
(58) Field of Search ......................... 384/492, 907–913

(56) References Cited

U.S. PATENT DOCUMENTS

| | | | | | |
|---|---|---|---|---|---|
| 3,972,108 | A | * | 8/1976 | Ericson et al. ................. | 419/33 |
| 4,113,558 | A | * | 9/1978 | Wade .......................... | 376/271 |
| 4,192,558 | A | * | 3/1980 | Wade .......................... | 384/49 |
| 4,439,557 | A | * | 3/1984 | Kawamura et al. .......... | 523/216 |
| 4,555,186 | A | * | 11/1985 | Scruggs ....................... | 384/93 |
| 4,592,782 | A | * | 6/1986 | Davies ........................ | 75/253 |
| 4,772,576 | A | * | 9/1988 | Kimura et al. ............... | 501/105 |
| 4,832,982 | A | * | 5/1989 | Mori et al. .................. | 427/597 |
| 4,906,110 | A | * | 3/1990 | Van Wyk et al. | |
| 4,927,714 | A | * | 5/1990 | Priceman .................... | 428/628 |
| 5,087,529 | A | * | 2/1992 | Engel et al. ................. | 428/552 |
| 5,093,207 | A | * | 3/1992 | Hodes et al. ................ | 428/614 |
| 5,103,293 | A | * | 4/1992 | Bonafino et al. ............ | 257/702 |
| 5,223,045 | A | * | 6/1993 | Priceman .................... | 148/268 |
| 5,271,679 | A | * | 12/1993 | Yamazumi et al. | |
| 5,403,373 | A | * | 4/1995 | Kitagawa et al. ............ | 75/238 |
| 5,480,228 | A | * | 1/1996 | Gambrill et al. ............ | 366/273 |
| 5,521,011 | A | * | 5/1996 | Ishidoya et al. ............. | 428/413 |
| 5,524,987 | A | * | 6/1996 | Vigeh ......................... | 384/209 |
| 5,675,181 | A | * | 10/1997 | Nishiura et al. ............. | 257/701 |
| 5,730,928 | A | * | 3/1998 | Ghosh et al. ................ | 264/629 |
| 5,782,930 | A | * | 7/1998 | Lin et al. .................... | 623/22.2 |
| 5,854,528 | A | * | 12/1998 | Nishikura et al. ....... | 310/323.01 |
| 5,904,211 | A | * | 5/1999 | Friant et al. ................. | 175/228 |
| 5,918,986 | A | * | 7/1999 | Matsui et al. ................ | 384/470 |
| 5,919,347 | A | * | 7/1999 | Gal-Or et al. ............... | 204/484 |
| 5,997,264 | A | * | 12/1999 | Klein et al. .................. | 417/420 |
| 6,001,761 | A | * | 12/1999 | Hata et al. ................... | 501/103 |
| 6,121,208 | A | * | 9/2000 | Toyota ........................ | 508/106 |
| 6,132,102 | A | * | 10/2000 | Bessone et al. ............. | 384/576 |
| 6,395,137 | B1 | * | 5/2002 | Snellman .................... | 162/371 |

FOREIGN PATENT DOCUMENTS

| | | | |
|---|---|---|---|
| DE | 42 35 838 A1 | * | 4/1993 |
| DE | 42 07 034 A1 | * | 9/1993 |
| DE | 196 06 249 A1 | * | 8/1996 |
| EP | 0 492 660 A1 | | 7/1992 |
| JP | 620007667 A | * | 5/1985 |
| JP | 64000258 A | * | 1/1989 |
| JP | 07187821 A | * | 12/1993 |
| JP | 9-87025 | * | 3/1997 |

OTHER PUBLICATIONS

"Stellite Metal and Powder", Reade Advanced Materials, 1997.*

* cited by examiner

Primary Examiner—William C. Joyce
Assistant Examiner—Julie K. Smith
(74) Attorney, Agent, or Firm—Burns, Doane, Swecker & Mathis, L.L.P.

(57) ABSTRACT

An improved rolling bearing, in particular one being used in aqueous environment, such as water and steam, comprising an outer race, an inner race, rolling elements, and a retainer holding said rolling elements in a spaced relation from each other, wherein the races of the bearing are made of stellite, the rolling elements are made of hot-isostatic-pressed alumina-zirconia composites, and the retainer is made of poly-ether ether ketone comprising graphite fibers, graphite powder, and polytetrafluoroethylene.

20 Claims, No Drawings

ROLLING BEARING

This application is based on and claims priority under 35 U.S.C. §119 with respect to Swedish Application No. 0004813-2 filed on Dec. 21, 2000, the entire content of which is incorporated herein by reference.

FIELD OF THE INVENTION

The present invention relates to improved rolling bearings, in particular bearings being used in aqueous environment, such as water and steam. Such bearings typically comprising, for example, an outer race, an inner race, a number of rolling elements, and a retainer holding said rolling elements in a spaced relation from each other, and which the bearing resists undue wearing.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Existing bearing systems are today based on steel, stainless steel, hybrid bearings (silicon nitride rolling elements) and all-ceramic (races and rolling elements of silicon nitride). These bearings systems using steel and silicon nitride ceramics all fail prematurely if water is present. These observations have been gained both from laboratory work, as well as in customer applications.

The difficulty with water is based on the fact that the water molecule is very small, whereby it enters microscopic cracks and cause embrittlement of most ceramics, containing a glassy phase, and steels. Water also cause polishing wear by surface oxidation of non-oxide ceramics, and crevice corrosion at standstill. Also, water does not show any tendency of forming elastohydrodynamic lubrication (EHL) films, leading to wear by surface-to-surface contacts.

It has been recognized that in order to solve these problems, bearings built with all ceramics, or hybrid bearings, having rolling elements of ceramics may have races of another material, e.g., steel might be useful. However, it is still the reduced ability of water to build thin EHL films at the contact between retainer and rolling elements of a ceramic material that creates a problem and in particular at high rotational speeds, thus such solutions have proved insufficient.

It is previously known (U.S. Pat. No. 5,271,679) to produce a rolling element bearing comprising outer and inner races, ball elements, and a retainer to keep the ball elements spaced from each other, whereby the retainer consists of a mixture of polytetrafluoroethylene, $MoS_2$, and $WS_2$, aramid fibres, and a polyether ether ketone (PEEK) resin. This bearing is intended to be used in air or vacuum in an environment having high or low temperature, in the presence of radioactive rays, or in any other environment not permitting the use of any lubricating oil or grease. The retainer material provides the lubricating material to the bearing. Outer and inner raceways, as well as the balls present are made of stainless steel.

JP-A-90-87025 relates to a ball bearing wherein at least a part of the inner and outer runways is made of or coated with cermet, stellite, or precipitated stainless steel, and at least the surface parts of the balls are formed of one kind of the materials selected from cermet, stellite, and ceramics composed mainly of silicon carbide. The runways and the rolling elements are made of different materials and so selected that the rolling elements possess the hardest surface. The bearing is intended to be used in water at elevated temperatures and high pressure.

DE-A-4,235,838 relates to a bearing wherein at least one of the inner runway, outer runway and rolling elements are made of a ceramic material consisting of sintered silicon nitride comprising 0.5 to 40% by weight of Mg, 0.3 to 3% by weight of Zr, and 1.5 to 5.0% by weight of a material selected from Sr, Al and a rare earth metal, and the reminder is silicon nitride. The metals are present as oxides. The bearing is intended to be used in a corrosive environment such as a melting furnace, metal melt plating bath or electro plating bath while molding alloys.

DE-A-4,207,034 relates to a bearing having an outer runway made of stellite. The bearing is intended for use in a device used in a bath of melt metal.

EP-A-0 492 660 relates to a retainer of a bearing which retainer consists of 15 to 50% by weight of glass fibres or the similar reinforcing fibres, 5 to 15% by weight of carbon fibres, and a balance of polyether ether ketone (PEEK). The bearing is intended for use at high temperatures.

DE-A-19,606,249 relates to a bearing retainer of polyimid resin in which 5 to 10% by weight is polytetrafluoroethylene (PTFE) and 10 to 20% by weight is graphite. The bearing is intended for use in high speed tools (300,000 to 400,000 rpm). The bearing is to be lubricated using paraffin.

U.S. Pat. No. 4,906,110 relates to a roller bearing having solid lubricants, whereby the retainer is made of a polyimid resin containing a selected solid lubricant.

SUMMARY OF THE INVENTION

A problem to be solved is to provide a bearing system that will work in water and/or steam environment from ambient temperature up to 100–300° C. and thereby withstand various types of water such as salt water, water contaminated or water based liquids. Initial bearing types are those used, e.g., in sea-water pumps, oil drilling heads, fire resistant hydraulic liquids, and compressors.

An object of the present invention is to obtain a rolling element bearing comprising a combination of materials suitable for aqueous environment, such as water, process fluids including water, oils with water contamination, fire resistant hydraulic liquids, steam, and the similar.

According to one aspect, the present invention provides a rolling bearing for use in an aqueous environment comprising: an outer race, an inner race, rolling elements, and a retainer holding said rolling elements in a spaced relation from each other, wherein the races of the bearing are made of stellite, the rolling elements are made of hot-isostatic-pressed alumina-zirconia composites, and the retainer is made of polyether ether ketone comprising graphite fibres, graphite powder, and polytetrafluoroethylene.

DETAILED DESCRIPTION OF THE INVENTION

The present invention has surprisingly been shown to solve the above-mentioned problems. According to the present invention, the races of the bearing are made of stellite (Co—Cr-alloy), the rolling elements are made of post-hot-isostatic-pressed alumina-zirconia composites, and the retainer is made of polyether ether ketone comprising graphite fibres, graphite powder, and polytetrafluoroethylene.

Further characteristics will be evident from the accompanying claims.

By means of the present invention, the graphite contents will provide for low friction in a humid environment as the graphite acts very favorably as solid lubricant in the presence of water molecules. An alternative is to use a material containing molybdenum disulphide ($MoS_2$) also an effective solid lubricant.

The Runways (Races)

The material of the bearing races is stellite. Stellites are cobalt chromium alloys. Typical stellite alloys suitable for this invention consist of 42–70% by weight Co; 23–38% by weight Cr; 4–22% by weight W; and 0.5–3% by weight C. This group of materials exhibits very excellent corrosion resistance and gailing resistance. Gailing resistance hereby means that the material can withstand a high load under oscillation without seizure which means less need for lubrication. Stellites have been used in bearings, seals and valves running under mild conditions in water and steam.

Rolling Elements

The rolling elements of the present bearing can take any form such as balls, rollers and needles. The selected ceramics for the rolling elements are post-hot-isostatic-pressed (HIPed) alumina ($Al_2O_3$)-zirconia ($ZrO_2$) composites. The amount of stabilized zirconia is about 40 to 70%, balance alumina. Typical commercial bearing grade silicon nitrides and other ceramic of interest for water environment is given in Table 1 below. The most preferred post-HIPed $Al_2O_3$—$ZrO_2$ variant (CTC) is manufactured from ceria (CeO) stabilized $ZrO_2$. The ceria stabilization gives CTC superior resistance to water ageing. This is shown in the appended autoclave test (300° C., 86 bars and 9 days) comparing various potential ceramic materials (Table 5). The CTC was after the exposure the only ceramic material combining high crushing strength and high critical impact strength with no surface changes. The CTA can also be used but only at running conditions below 100° C.

Two preferred qualities comprise: CTA 60% $ZrO_2$ (yttria stabilized) and 40% alumina (Ceram Tools A/S), and CTC 60% $ZrO_2$ (ceria stabilized) and 40% alumina (Ceram Tools A/S). These composites have low portion of glassy grain boundary phases compared to silicon nitrides, combined with excellent crushing strengths and critical impact load resistance compared to high strength bearing grade silicon nitrides (Tables 3 and 4). A low content of glass and the oxide structure give the CTA and CTC ceramics excellent resistance against polishing wear and stress-corrosion in a humid environment (Table 2).

Oxide ceramics have also a favourable run-in behaviour in water compared to nitrides and carbides resulting in a low friction coefficient.

Post-HIPed alumina-zirconia composites have mechanical properties similar to, or better than, silicon nitrides at room temperature. Alumina and zirconia crystals are at high temperatures more ductile compared to silicon nitrides which makes it easier to heal micropores in the ceramic material by HIP leading to material less sensitive to contact fatigue at micro contacts under poor lubrication conditions.

Monolithic alumina, with 0–10% grain growth controlling and sintering additives, have generally inferior impact resistance and toughness compared to silicon nitrides and the alumina-zirconia composites. These factors inhibit their use in rolling bearing applications.

Monolithic zirconia materials, with 0–10% stabilizing, grain growth controlling and sintering additives, have a higher density compared to alumina and silicon nitrides. Zirconia loses its good mechanical properties in water/steam environment at a temperature of about 200° C. Alumina-zirconia composites have superior performance in humid environments compared to the monolithic zirconia materials. The low elastic module of zirconia, similar to that of steel, is an advantage in rolling bearing applications. However, zirconia has a hardness of 1200 HV which lies in the vicinity of common contaminants such as quartz sand. The alumina-zirconia composites show a higher hardness.

The Retainer

The polymer polyarylether ketone (PEEK), Victrex) can withstand water and steam above 250° C. without sustaining deteriorating mechanical properties. However, it does not have particularly good tribological properties by itself. The tribological properties of PEEK in water/steam are substantially improved by adding 5–15% of graphite fibres, 5–15% of graphite powder and 5–15% of polytetrafluoroethylene to the PEEK (PEEK 450 FC30, Victrex being one selected quality).

TABLE 1

Ceramic materials for rolling elements to bearings

| Material | Manufacturer | Sintering process | Main composition | Additives |
|---|---|---|---|---|
| NBD 200 | Norton, USA | HIP[1] | $Si_3N_4$ | MgO |
| TSN-3NH | Toshiba, Japan | post-HIP[2] | $Si_3N_4$ | $Y_2O_3$/$Al_2O_3$/$TiO_2$ |
| N3212 | CFI, Germany | post-HIP[2] | $Si_3N_4$ | $Y_2O_3$/$Al_2O_3$ |
| TSN-15H | Toshiba, Japan | post-HIP[2] | $Si_3N_4$ | $MgAl_2O_4$ |
| Ekasic-T | ESK, Germany | | SiC | — |
| Y-TZP | Nikkato, Japan | post-HIP[2] | $ZrO_2$ | $Y_2O_3$-stabilization |
| CTA | Ceram Tools A/S, Norway | post-HIP[2] | $Al_2O_3$/$ZrO_2$ | $ZrO_2$ stabilized with yttria |
| CTC | Ceram Tools A/S, Norway | post-HIP[2] | $Al_2O_3$/$ZrO_2$ | $ZrO_2$ stabilized with ceria |

HIP[1]: Hot-isostatic pressing as sintering process
post-HIP[2]: HIP after sintering as the last cycle in the sintering process

TABLE 2

Hertzian cycle contact to a maximum contact pressure of 5 GPa. Surface condition after 2.0 million load cycles at 10 Hz and room temperature. A hard metal ball (WC/Co) was loaded on to a polished flat ceramic specimen, cut from a ceramic ball. The CTA was included as the general reference for hot-isostatic pressed alumina-zirconia composites.

| Material | Air | Water |
|---|---|---|
| NBD200 | No damage | Damage |
| TSN-3NH | — | Damage[1] |
| CTA | No damage | No damage |

[1]1.5 million load cycles

TABLE 3

Crushing strength of[1]7/32" high strength ceramic ball grades

| Material | Crushing strength (kN) |
|---|---|
| TSN-3NH | 47.0 |
| N3212 | 43.6 |
| CTA | 71.3 |
| CTC | 85.8 |

TABLE 4

Critical impact load for formation of C-cracks on 7/32" high toughness ceramic balls. Ceramic ball-to-ceramic ball contact.

| Material | Critical impact load (kN) |
| --- | --- |
| TSN-3NE | 9.5 |
| N3212 | 8.0 |
| CTA | 18.0 |
| CTC | 15.5 |

TABLE 5

Weight loss (mg/cm$^2$); diameter change (micron); crushing strength (kN); and critical impact load (kN) of ceramic ½" balls. The balls were autoclaved in water at 300° C. and 86 bars for 9 days.

| Material | Weight loss (mg/cm$^2$) | Diameter change (micron) | Crushing strength (kN) | Critical impact load (kN) |
| --- | --- | --- | --- | --- |
| NBD200 | 13.0 | −14.5 | 40.0 | 2.3 |
| TSN-3NH | 9.0 | +3.0 | 42.0 | 5.0 |
| TSN-15H | 23.0 | −18.0 | 30.0 | 5.4 |
| EkasicT | 0.0 | +2.0 | 10.5 | 0.8 |
| Y-TZP | —$^1$ | −12.0$^1$ | —$^1$ | —$^1$ |
| CTA | —$^2$ | —$^2$ | —$^2$ | —$^2$ |
| CTC | +/−0.0 | +/−0.0 | 53.0 | 21.4 |

$^1$2 days, no measurements were, done except on diameter change
$^2$material collapsed due to severe condition The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rolling bearing for use in an aqueous environment comprising: an outer race, an inner race, rolling elements, and a retainer holding said rolling elements in a spaced relation from each other, wherein the races of the bearing are made of a Co—Cr containing alloy, the rolling elements are made of hot-isostatic-pressed alumina-zirconia composites, and the retainer is made of polyether ether ketone comprising graphite fibres, graphite powder, and polytetrafluoroethylene.

2. The bearing according to claim 1, wherein the retainer is made of polyether ether ketone comprising 5 to 15% by weight of graphite fibres, 5 to 15% by weight of graphite powder, and 5 to 15% by weight of polytetrafluoroethylene.

3. The bearing according to claim 1, wherein the retainer further comprises a coating of a thermosetting, bonded coating based on graphite and an organic binding agent.

4. The bearing according to claim 1, wherein the polyether ether ketone is a polyaryl ether ketone.

5. The bearing according to claim 2, wherein the amount of graphite fibres is 10% by weight.

6. The bearing according to claim 2, wherein the amount of graphite powder is 10% by weight.

7. The bearing according to claim 2, wherein the amount of polytetrafluoroethylene is 10% by weight.

8. The bearing according to claim 1, wherein the rolling elements are made of hot-isostatic-pressed alumina-zirconia composite with alumina content of 20–80% by volume and a zirconia content of 80–20% by volume.

9. The bearing according to claim 8, wherein the rolling elements are made of hot-isostatic-pressed alumina-zirconia composite with alumina content of 60% by volume and a zirconia content of 40% by volume wherein the zirconia is stabilized by a ceria addition.

10. The bearing according to claim 1, wherein the rolling elements are made of hot-isostatic-pressed alumina-zirconia composite with alumina content of 60% by volume and a zirconia content of 40% by volume wherein the zirconia is stabilized by a ceria addition.

11. The bearing according to claim 8, wherein the races are made of an alloy having a composition comprising 42–70% by weight Co; 23–38% by weight Cr; 4–22% by weight W; and 0.5–3% by weight C.

12. A rolling bearing comprising:

inner and outer races, the races made from a Co—Cr containing alloy;

rolling elements made from an alumina-zirconia composite comprising 20–80% by volume of alumina and 80–20% by volume of zirconia; and a retainer holding the rolling elements in a spaced relation from each other, the retainer made from a polyether ether ketone comprising graphite fibres, graphite powder and polytetrafluoroethylene.

13. The bearing according to claim 12, wherein the retainer is made of polyether ether ketone comprising 5 to 15% by weight of graphite fibres, 5 to 15% by weight of graphite powder, and 5 to 15% by weight of polytetrafluoroethylene.

14. The bearing according to claim 12, wherein the retainer further comprises a coating of a thermosetting, bonded coating based on graphite and an organic binding agent.

15. The bearing according to claim 12, wherein the polyether ether ketone is a polyaryl ether ketone.

16. The bearing according to claim 12, wherein the amount of graphite fibres is 10% by weight.

17. The bearing according to claim 12, wherein the amount of graphite powder is 10% by weight.

18. The bearing according to claim 12, wherein the amount of polytetrafluoroethylene is 10% by weight.

19. The bearing according to claim 12, wherein the rolling elements are made of hot-isostatic-pressed alumina-zirconia composite with alumina content of 60% by volume and a zirconia content of 40% by volume wherein the zirconia is stabilized by a ceria addition.

20. The bearing according to claim 12, wherein the races are made of an alloy having a composition comprising 42–70% by weight Co; 23–38% by weight Cr; 4–22% by weight W; and 0.5–3% by weight C.

* * * * *